April 20, 1926.          C. S. HOLROYD          1,581,444
RAT AND MOUSE TRAP
Filed May 3, 1923

Inventor
Charles S. Holroyd

Patented Apr. 20, 1926.

1,581,444

UNITED STATES PATENT OFFICE.

CHARLES S. HOLROYD, OF CARLTON, OREGON.

RAT AND MOUSE TRAP.

Application filed May 3, 1923. Serial No. 636,303.

*To all whom it may concern:*

Be it known that I, CHARLES S. HOLROYD, a citizen of the United States, residing at Carlton, in the county of Yamhill and State of Oregon, have invented certain new and useful Improvements in a Rat and Mouse Trap, of which the following is a specification.

This invention relates to animal traps and more particularly to the class of devices for trapping and destroying rodents such as rats and mice.

The primary object is to provide a trap of this character, which, after being erected and baited, will not require further attention, but will continue to operate automatically after each rodent is caught and destroyed.

The invention further aims to provide a structure which will be so arranged and baited as to lure the rodents into the trap and cause them to be precipitated into a body of water and thereby drowned.

Further objects of the invention will appear upon consideration of the following detailed description and accompanying drawings, wherein.

Figure 1:
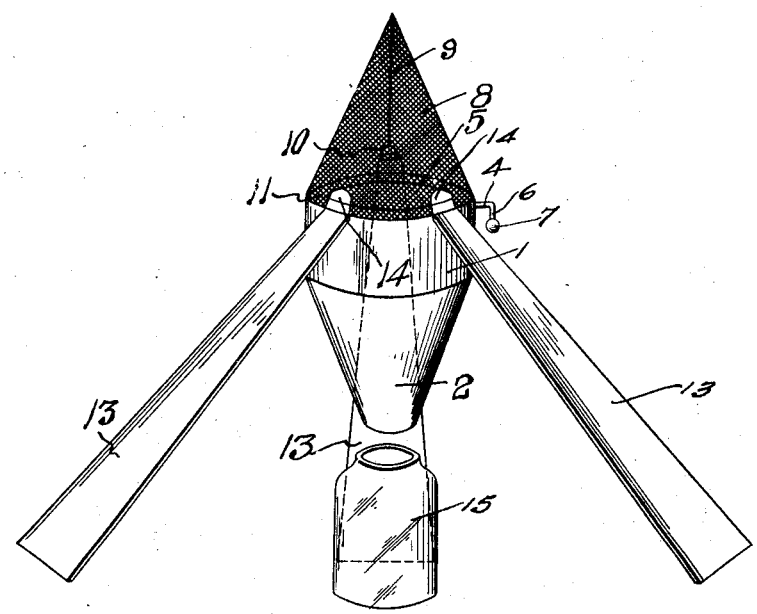
Figure 1 is a perspective view of the device constructed in accordance with my invention.
Figure 2:
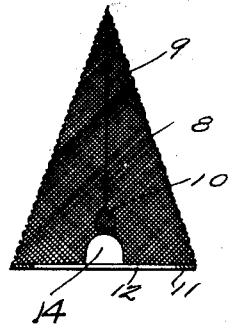
Figure 2 is a detailed view of the top of the trap.

Referring to the drawings by numerals, the body 1 of the trap is preferably of cylindrical or square formation and is provided with a substantially conical bottom section 2 forming a discharge chute having an open end 3. In the upper open end of the body 1 is arranged a diametrically extending rod 4 journalled in suitable openings whereby the rod 4 may readily turn. Attached to the rod is a circular trap door 5 which is adapted to swing with the rod whereby the door may be opened and closed. The outer end of the rod 4 is provided with a right angular extension 6 to which is attached a weight 7 which will normally hang downwardly thus utilizing the force of gravity to normally maintain the trap door 5 in a horizontal plane. The weight 7, however, is not any heavier than is necessary to permit the trap door 5 to freely swing when any weight is placed upon the trap door.

Mounted upon the top of the body 1 is a conical hood 8, from the top of which is suspended a cord or wire 9 to receive a piece of bait 10, whereby the bait will be suspended centrally within the hood 8. The base 11 of the hood is adapted to rest upon the top of the body 1 and the base is equipped with an opening 12 to receive the circular trap door 5. The body of the trap is supported above the floor by angular runways 13 connected to the trap and forming substantially a tripod to maintain the body of the trap in elevated position. The hood 8 is provided with openings 14 at the upper ends of the runways 13 whereby rodents passing up the runways may enter the trap through the openings 14.

Figure 3:
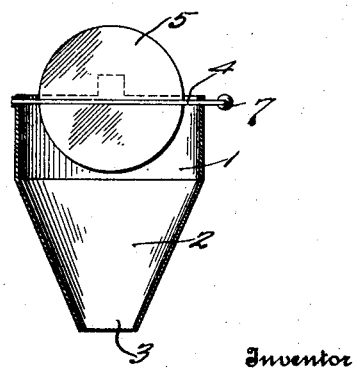
Figure 3 is a detailed cross section through the body of the trap showing the discharge chute, the trap door being in open position.

Below the chute, and in line with the opening 3, is a vessel or container 15 which holds a quantity of water into which the rodent is discharged when the trap operates. After the trap is set the rats or mice will be lured through the openings 14 by their attempt to obtain the bait 10. The rodent places its weight on the trap door 5, when the latter will immediately swing to the position shown in Figure 3 and the rodent will thus be precipitated through the chute and out through the opening 3 and into the water contained in the vessel 15. The vessel 15 is so arranged as to prevent the rodent from escaping therefrom it will be apparent that the rodent will drown and thus be destroyed. By virtue of the weight 7, the trap door 5 will promptly return to operative position so as to be ready for the next victim.

Minor changes may be made in the details of construction without departing from the spirit of the invention or the scope of the claim hereunto appended.

What I claim is:

A trap comprising a substantially cone shape body having its end of large diameter upwardly disposed, a trap door pivotally mounted at the upper end of the body, a hood disposed over the upper end of the body and provided at its side with openings, runways connected at their upper ends with the body at the openings in the hood, said runways being arranged in the form of a tripod, the runways being greater in length than the vertical height of the cone shaped body and whereby the lower smaller end of the body is elevated above the surface of the support upon which the runways may rest.

In testimony whereof I have affixed my signature.

CHARLES S. HOLROYD.